US010768981B2

(12) United States Patent
Gasser et al.

(10) Patent No.: US 10,768,981 B2
(45) Date of Patent: Sep. 8, 2020

(54) DYNAMIC TIME SLICING FOR DATA-PROCESSING WORKFLOW

(71) Applicant: Microsoft Technology Licensing, LLC, Redmond, WA (US)

(72) Inventors: Michael Allen Gasser, Redmond, WA (US); David Kemal Felstead, Bothell, WA (US); Michael Joseph Wetzel, Renton, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 170 days.

(21) Appl. No.: 16/014,995

(22) Filed: Jun. 21, 2018

(65) Prior Publication Data

US 2019/0391845 A1    Dec. 26, 2019

(51) Int. Cl.
*G06F 9/46*      (2006.01)
*G06F 9/48*      (2006.01)
*G06F 16/25*     (2019.01)

(52) U.S. Cl.
CPC .......... *G06F 9/4881* (2013.01); *G06F 16/254* (2019.01)

(58) Field of Classification Search
CPC .............................. G06F 9/4881; G06F 16/254
See application file for complete search history.

(56) References Cited

U.S. PATENT DOCUMENTS

| 6,438,704 B1* | 8/2002 | Harris ................... G06F 9/4881 710/58 |
| 2007/0277174 A1 | 11/2007 | Cai et al. |
| 2015/0106819 A1* | 4/2015 | Kim ...................... G06F 9/4887 718/103 |

FOREIGN PATENT DOCUMENTS

EP    2819009 A2    12/2014

OTHER PUBLICATIONS

"Extract, Transform, Load", Retrieved from: http://web.archive.org/web/20131210010940/http://en.wikipedia.org/wiki/Extract,_transform,_load, Dec. 3, 2013, 7 Pages.
"Scheduling (Computing)", Retrieved from https://en.wikipedia.org/wiki/Scheduling_(computing), Apr. 24, 2015, 13 Pages.
Gerber, et al., "Slicing Real-Time Programs for Enhanced Schedulability", In Journal of ACM Transactions on Programming Languages and Systems, vol. 19, No. 3, May 1, 1997, pp. 525-555.
"International Search Report and Written Opinion Issued in PCT Application No. PCT/US2019/037128", dated Nov. 26, 2019, 16 Pages.

* cited by examiner

*Primary Examiner* — Camquy Truong
(74) *Attorney, Agent, or Firm* — Alleman Hall Creasman & Tuttle LLP

(57) ABSTRACT

A method for dynamically scheduling a data-processing workload includes recognizing minimum and maximum execution slice sizes and predicting an execution slice size for a current job of a collection of jobs. If the predicted execution slice size exceeds the maximum slice size or if the job involves date-dependent records in the future of the current date, the job is split into a working slice and a remainder slice, the remainder slice is added to the collection of jobs and the working slice is executed. Otherwise, if the predicted execution slice size is between the minimum and maximum execution slice sizes, the current job is executed.

20 Claims, 4 Drawing Sheets

DYNAMIC TIME SLICING FOR DATA-PROCESSING WORKFLOW

BACKGROUND

Data-processing workflows may achieve increased throughput when a large amount of data is processed in a batch, for example, due to a reduced overhead relative to each datum in the batch. However, a large batch size may result in a large latency for processing the batch, for example, due to waiting for the whole batch of data to be available.

SUMMARY

A method for dynamically scheduling a data-processing workload includes recognizing minimum and maximum execution slice sizes and predicting an execution slice size for a current job of a collection of jobs. If the predicted execution slice size exceeds the maximum slice size or if the job involves date-dependent records in the future of the current date, the job is split into a working slice and a remainder slice, the remainder slice is added to the collection of jobs and the working slice is executed. Otherwise, if the predicted execution slice size is between the minimum and maximum execution slice sizes, the current job is executed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
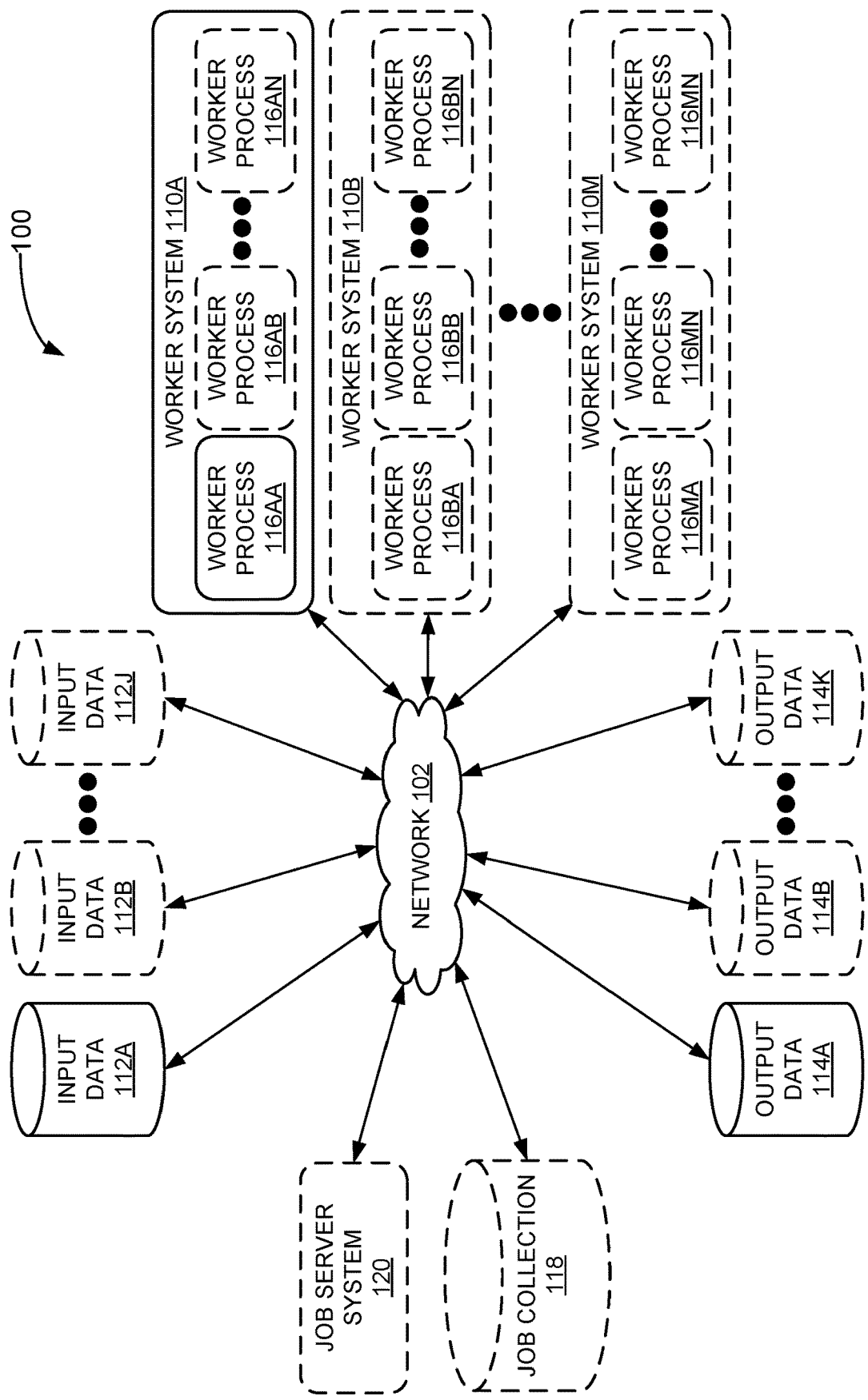
FIG. 1 shows a concurrent scheduling system.

FIG. 1 shows relevant aspects of an exemplary concurrent scheduling system 100 in which one or more worker systems 110 cooperate to dynamically schedule and execute a data-processing workflow.

Concurrent scheduling system 100 includes one or more computer devices configured as worker systems 110. For example, concurrent scheduling system 100 includes worker system 110A, and optionally further includes additional worker systems such as worker system 110B up to worker system 110M. The number of worker systems, M, may be any suitable number (e.g., one, two, 10s, 100s, 1000s, or more).

The worker systems 110 are each configured to communicatively couple, via a network 102, to one or more input data sources 112 (e.g., input data 112A, and optionally further input data sources such as input data 112B up to input data 112J). Network 102 may be any suitable computer network (e.g., the Internet). The worker systems are each configured to further communicatively couple to one or more output data sinks 114 (e.g., output data 114A, and optionally further output data sinks such as output data 114B up to output data 114K). The worker systems 110 generally process data from the one or more input data sources 112 to produce outputs for storage in the one or more output data sinks 114. The number of data sources, J, and the number of data sinks, K, each may be any suitable number (e.g., one, two, 10s, 100s, 1000s, or more).

Each worker system of the one or more worker systems is configured to execute one or more concurrent worker processes 116. For example, worker systems 110A is configured to execute worker process 116AA, and optionally to execute further worker processes such as worker process 116AB up to worker process 116AN. Similarly, worker system 110B is configured to execute worker processes such as worker process 116BA up to worker process 116BN, and worker system 110M is configured to execute worker processes such as worker process 116MA up to worker process 116MN. Each worker system may execute any suitable number of worker processes (e.g., one, two, 10s, 100s, 1000s, or more), and each worker system may execute a different number of worker processes as compared to other worker systems. Accordingly, the one or more worker systems are configured to collectively provide one or more concurrent worker processes 116 (e.g., one, two, 10s, 100s, 1000s, or more worker processes in total).

The worker processes 116 are configured to collectively execute a data-processing workload in the form of a collection of data-processing jobs. Accordingly, each worker process is configured, concurrently with the other worker processes, to select and execute a job of the collection of jobs (e.g., according to methods 200 and 300, which will be described in detail below). Executing a job generally includes receiving input data from one or more of the input data sources 112, processing the input data, and storing results of such processing in one or more of the output data sinks 114.

In some examples, a job may depend on processed results (e.g., intermediate results) from a different job (e.g., a prerequisite job). Accordingly, in some examples, a worker process is configured to receive and process data from one or more of the output data sinks 114, instead of or in addition to the input data from input data sources 112. In some examples, an input data source and an output data sink may be implemented as a single device and/or logical construct (e.g., an input data source and an output data source implemented as two different databases on a single computing device, or as different portions of a single database or data structure).

Each job in the collection of jobs represents a slice of data-processing work from the data-processing workload. "Slice" may refer herein to any collection of data-processing tasks. For example, a slice may be defined by a particular collection of data for processing. The collection of data for a slice may include data from one or more particular data sources, data having particular time-stamps, data related to one or more particular topics, users, organizations, and/or computer systems, or any other collection of data defined based on a suitable criterion.

In some examples, data for processing include one or more data-dependent records. A date-dependent record includes data and an associated time-stamp, indicating a date and/or time associated with the record. A time-stamp for a date-dependent record may describe a time in any suitable format, e.g., a calendar date, a clock time, or a computer-readable time-stamp such as a Unix time-stamp. The time-stamp may be expressed at any suitable resolution, e.g., in nanoseconds, milliseconds, seconds, minutes, hours, days, weeks, months, years, or any other resolution. Different date-dependent records (e.g., date-dependent records associated with different slices of a data-processing workload) may be expressed in different formats and/or resolutions. Date-dependent records may have time-stamps indicating an absolute time (e.g., Jan. 1, 2000) and/or a relative time or time offset (e.g., 3 days relative to a reference date, such as the current date). "Date" and "time-stamp" may generally refer herein to any time and/or date, e.g., an absolute or relative time expressed at any suitable resolution.

A data-processing workload may generally include processing a series of date-dependent records representing data collected over a period of time indicated in time-stamps of the date-dependent records. The series of date-dependent records may include periodic and/or regularly scheduled records (e.g., a record every minute, or a daily record) and/or records at arbitrary times. In some examples, date-dependent records for a particular time-stamp may be indicated as missing, or there may be a plurality of different date-dependent records for a particular time-stamp.

A slice of the data-processing workload may be defined based on time-stamps for date-dependent records in any suitable fashion. For example, a slice may include date-dependent records having time-stamps falling within a particular range/duration (e.g., records having time-stamps between Jan. 1, 2000 and Jan. 1, 2001). Alternately or additionally, a slice may include date-dependent records having time-stamps that occur with a particular periodicity or according to a particular schedule (e.g., records for every hour, or records for every odd-numbered calendar day).

In some examples, a slice may be defined based on a range and/or duration that spans into the future of the current date, e.g., a slice of the next 10 years of data, or a slice defined in 2018 having a range from Jan. 1, 2010 to Jan. 1, 2020. In some examples, a slice may be defined to include data associated with past dates which is nevertheless not yet available, e.g., data for past dates which is not yet or not currently available. In some examples, new data may gradually become available (e.g., at input data sources 112) during the data-processing workload. For example, when a slice is defined to include data for the next 10 years, initially most of the data for the slice would not be available, but as time passes and further data is gathered, the data may be gradually made available at input data sources 112.

The worker processes 116 are generally configured to select slices for execution so as to process a large slice of data when sufficient data are available for processing. Processing a large slice of data in a slice may improve a throughput and/or computational efficiency for processing the slice, for example, due to a constant overhead for processing the whole slice which is smaller relative to the overall processing time for the slice when a larger number of data are processed in the slice. The worker processes 116 are further configured to process a smaller slice of data when a smaller number of data are available for processing, which may reduce a latency to process the slice. In particular, when data is gradually made available (e.g., when data for a current time are repeatedly received as time passes), the worker processes may be able to process small slices of the data as it becomes available. By processing the data in small slices with correspondingly small latencies, the worker processes may make results of processing new data available in real-time or near-real-time as the new data become available.

In some examples, a worker process may select a slice for execution based on a duration of date-dependent records for processing, e.g., a slice of 1 year of data. In some examples, the worker processes may select slice sizes constrained by a minimum execution slice size representing a minimum duration of date-dependent records for processing in a job, and a maximum execution slice size representing a maximum duration of date-dependent records for processing in a job. Alternately or additionally, a worker process may select a slice for execution based on a number of date-dependent records (e.g., 1000 date-dependent records, irrespective of a time-stamp resolution for the date-dependent records). Alternately or additionally, a worker process may select a slice for execution taking a duration, resolution, and/or number of time-stamps into account, e.g., a slice of data spanning a duration of 1 year, with date-dependent records sampled approximately every 9 hours so that there are approximately 1000 date-dependent records in total.

In some examples, the workers are configured to collectively access and/or maintain a collection of jobs in order to coordinate the data-processing workflow in a distributed fashion. Accordingly, concurrent scheduling system 100 may optionally include a job collection database 118.

Job collection database 118 is a concurrently-accessible representation of metadata, data and/or tasks for a data-processing workflow, configured for concurrent reading and/or writing by each worker process of the plurality of worker processes. For example, job collection database 118 may be a database, a concurrent data structure, or any other suitable data repository. Job collection database 118 describes each data-processing task in the workflow as well as runtime state data related to the data-processing tasks. For example, job collection database 118 may include descriptions for one or more jobs, wherein each description indicates data for the job (e.g., by indicating one of the input data sources 112, by indicating a file and/or network location, by indicating a database query, or otherwise indicating data for the job in any other suitable manner).

Job collection database 118 coordinates the runtime state of each job to facilitate completion of the data-processing workflow. For example, job collection database 118 may be configured to mark a job as locked while it is being processed by a worker process, e.g., so as to avoid redundant processing and/or conflicts due to processing of the job by more than one different worker process. Job collection database 118 is configured to mark a job as completed after it is finished. Job collection database 118 is configured to mark a job as failed if the job is not completed due to an error (e.g., so that the job can be resumed and/or restarted at a later time). Job collection database 118 is configured to add new jobs which may arise while completing other jobs. For example, as will be described below, a worker process may split a job into two or more smaller jobs which may be added to the job collection database 118 to be completed later (e.g., by a different worker process).

In some examples, concurrent scheduling system 100 optionally further includes a job server system 120 configured to centrally coordinate the data-processing workflow by communicatively coupling to the worker systems 110, input data sources 112, and/or output data sinks 114. Job server system 120 may be any suitable computer system, e.g., a computer server, cloud service, server cluster, or a computer of an administrator of the data-processing workflow.

In some examples, job server system 120 maintains a collection of jobs as a database and/or concurrent data structure, configured for concurrent reading and writing by the plurality of worker processes. In other examples, job server system 120 communicatively couples to job collection database 118 in order to access and/or maintain the collection of jobs stored in job collection database 118 (e.g., by adding and/or removing jobs and/or data sources).

The concurrent collection of jobs (whether maintained collectively by the worker processes 116, by job server system 120, or in a separate device as job collection database 118) may be implemented as any suitable data structure, e.g., heap, tree, list, hash table, etc. The concurrent data structure may be implemented using locking, lock-free and/or wait-free programming techniques, and/or with hardware and/or software transactional memory, read-copy update, or any other suitable concurrent programming techniques. In some examples, the concurrent data structure may be stored in a distributed fashion across one or more storage devices, e.g., storage devices of the worker processes 116. In some examples, the concurrent data structure may be stored/accessed according to one or more decentralized data structures (e.g., version control systems, blockchain, etc.).

In some examples, an administrator of the data-processing workflow may control the data-processing workflow via commands issued at job server system 120. For example, the administrator may set a minimum execution slice size and/or a maximum execution slice size. In another example, the administrator may add or remove jobs from the collection of jobs. More generally, the administrator may tune the data-processing workflow in any suitable manner, e.g., by re-configuring databases, worker systems, worker processes, etc.

Figure 2:
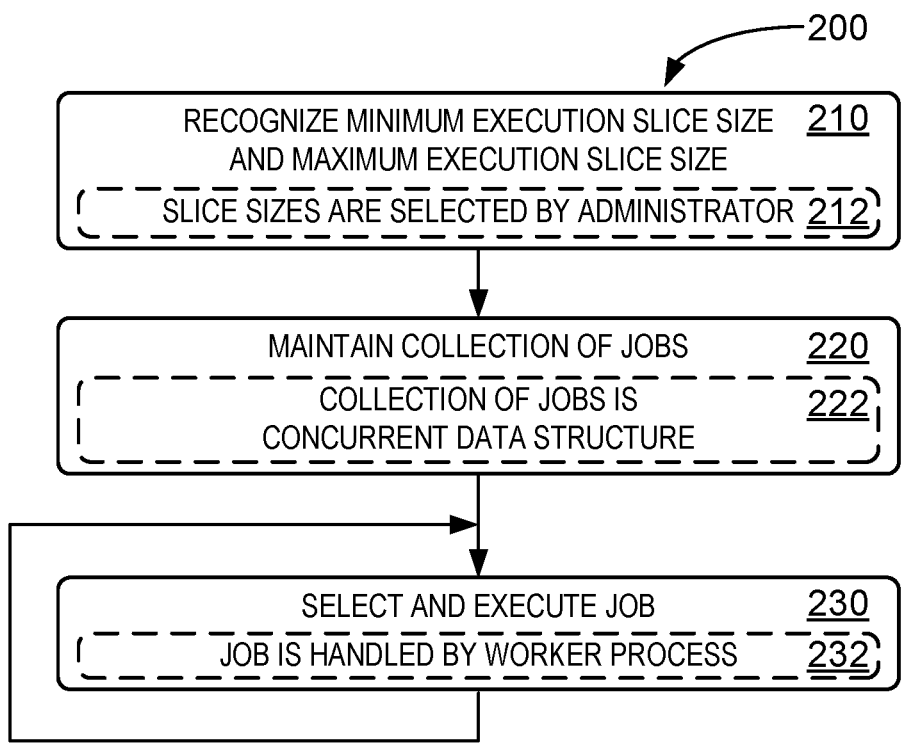
FIG. 2 shows a method for distributing work in a data-processing workflow.

FIG. 2 shows a non-limiting example of a method 200 for distributing work among one or more worker processes. Method 200 processes input data from one or more input data sources in order to transmit output data to one or more output data sinks. Method 200 may be enacted by a concurrent scheduling system (e.g., concurrent scheduling system 100). For example, method 200 may be enacted collectively by one or more worker processes, optionally in cooperation with a job server system and/or a job collection database.

Method 200 is as an illustrative example of a work distribution method for distributing work among one or more worker processes. Method 200 includes a concurrent loop in which one or more worker processes each select a new job to execute, based on a minimum execution slice size and a maximum execution slice size recognized for a data-processing workflow. The worker processes may be configured to perform a work selection method to adaptively select and execute jobs based on a minimum execution slice size and a maximum execution slice size.

At 210, method 200 includes recognizing a minimum execution slice size representing a minimum duration of date-dependent records for processing in a job, and a maximum execution slice size representing a maximum duration of date-dependent records for processing in a job. In some examples, the minimum and/or maximum execution slice sizes are fixed, predefined sizes for all jobs being handled in the data-processing workflow. In other examples, the minimum and/or execution slice sizes may vary for different jobs in the data-processing workflow. Optionally, in some examples, at 212, the minimum execution slice size and the maximum execution size are selected by an administrator of the data-processing workflow.

At 220, method 200 includes maintaining a collection of jobs. Optionally, at 222, the collection of jobs is a concurrent data structure configured for concurrent reading and/or writing by a plurality of worker processes. Accordingly, the collection of jobs may be accessed simultaneously by two or more worker processes without contention and/or waiting. As described above with regard to FIG. 1, the collection of jobs may be maintained collectively by the worker processes, maintained by a job server, and/or implemented in a separate device as a job collection database.

At 230, method 200 includes selecting and executing a job of the collection of jobs. In some examples, at 232, each worker process is configured, concurrently with the other worker processes, to select and execute the job. Accordingly, while the job is handled by one worker process, other jobs may be handled simultaneously by different worker processes.

Figure 3:
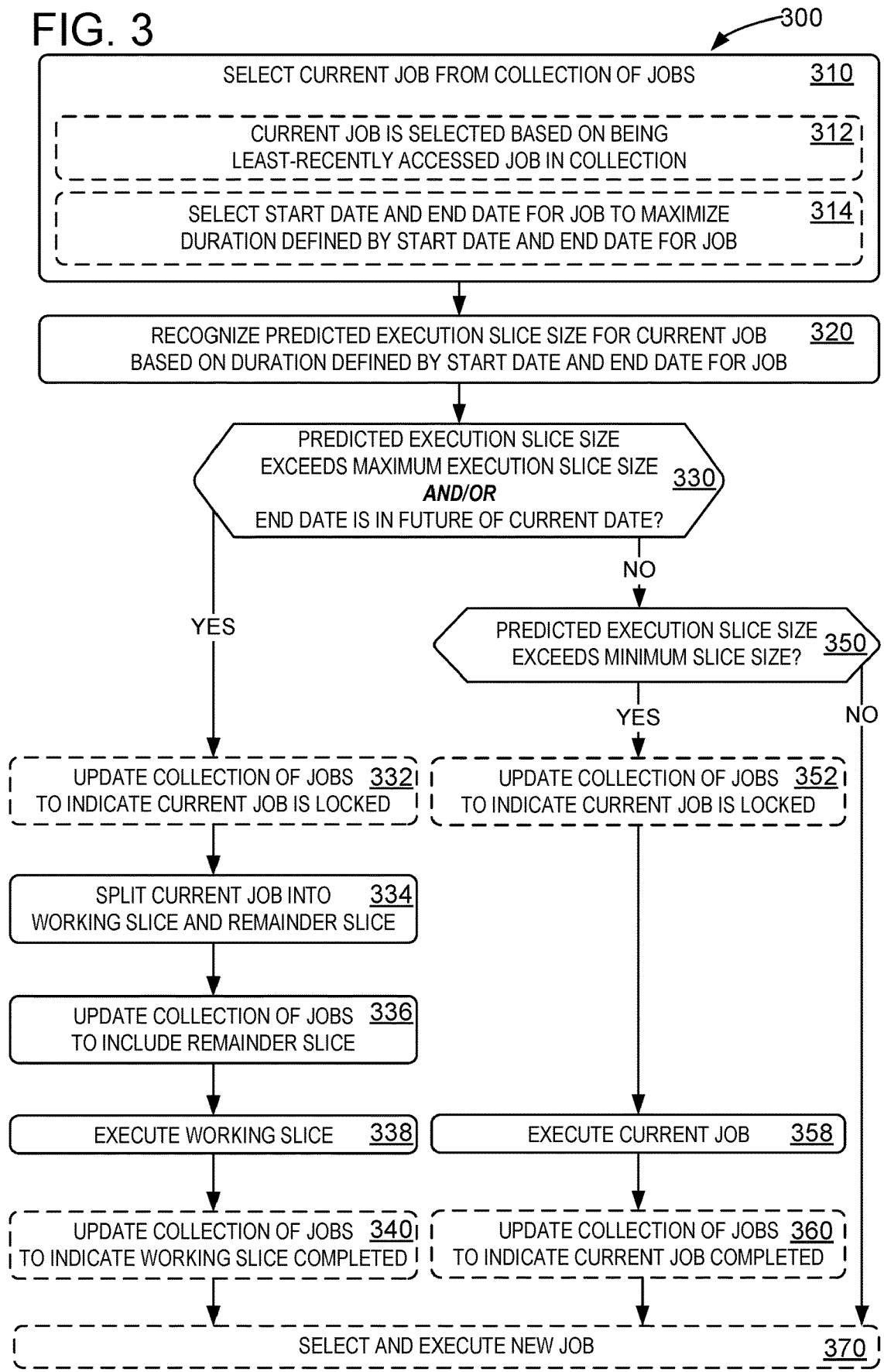
FIG. 3 shows a method for selecting and executing a job in a data-processing workflow.

FIG. 3 shows an exemplary work selection method 300 for selecting and executing a job, e.g., while performing method 200 at 230. Processing a smaller number of date-dependent records at a time may be desirable for near-real-time operation, but may have relatively low throughput. In contrast, processing a larger number of date-dependent records may improve throughput, but it may increase a latency before data is available, which may be unsuitable for real-time or near-real-time data-processing workflows. Accordingly, method 300 is an example of a work selection method which includes adaptively selecting large slices of work to increase throughput when possible, while also selecting small slices of work to decrease latency when smaller amounts of data are available (e.g., in real-time and/or near-real-time data-processing workflows).

A concurrent scheduling system (e.g., concurrent scheduling system 100 of FIG. 1) implemented according to method 200 and method 300 may adaptively select large slices of work for execution (e.g., defined by the maximum execution slice size) whenever possible, while adapting to a low-latency regime and processing smaller slices of work when the work is only gradually available. For example, worker processes in a concurrent scheduling system may be configured to select and execute jobs according to method 300. The concurrent scheduling system may adapt to errors caused by insufficiency of resources by adjusting execution slice sizes. The concurrent scheduling system may dynamically schedule jobs to achieve good throughput and/or latency for arbitrary data-processing workflows.

Although the present description is with regard to method 200, any other suitable work distribution method may incorporate work selection method 300. Accordingly, any other suitable work-distribution method in which work is selected according to method 300 may achieve similar improvements to throughput and/or latency. Non-limiting examples of work distribution methods suitable for use with method 300 (e.g., as a replacement for method 200) include fair scheduling algorithms, fair distribution algorithms, multiprocessor scheduling algorithms, bin-packing algorithms, job shop scheduling algorithms, flow shop scheduling algorithms, integer and/or float linear programming, and dynamic programming.

Accordingly, processing data according to methods 200 and 300 may adaptively improve throughput by processing large slices including a large number of data when such data are available, while also adaptively reducing latency by processing small slices including a small number of data when only a small number of data are available. For example, when new input data is gradually made available, methods 200 and 300 may adaptively process such new data in small slices, so as to complete each slice in real-time or near-real-time as data for the slice become available.

At 310, method 300 includes selecting a current job from the collection of jobs. Jobs may be selected based on selecting input data for processing, e.g., by selecting an input data source and a slice of date-dependent records from the input data source. Optionally, at 312, the current job is selected based on being a least-recently accessed job in the collection of jobs. Selecting a least-recently-accessed job may result in eventual handling of a diverse selection of jobs of the collection of jobs, e.g., eventual handling of at least a portion of all of the jobs in the collection. Selecting a least-recently accessed job may also prevent the repeated selection of a single job of the collection of jobs, e.g., even when the single job requires more work, has more recent data, etc.

Alternately or additionally, selecting the current job may be based on any other suitable criteria. In some examples, one or more jobs of the collection of jobs are prioritized. Accordingly, selecting the current job may include selecting from among jobs having a relatively high priority (e.g., a highest priority).

Optionally, at 314, a job may be selected by selecting a start date and an end date for date-dependent records associated with the current job, so as to maximize a duration defined by the start date and the end date for the job. Selecting a job so as to maximize the duration for date-dependent records in a job may adaptively increase throughput for the job. For example, when a worker process is configured to select jobs so as to maximize the duration for the date-dependent records in the job, the worker process may process a large number of records at one time, thereby reducing processing overhead for the job and accordingly increasing throughput.

Although jobs may be selected to maximize the number of date-dependent records being processed, the overall size of any job may be subject to constraints, e.g., based on the maximum execution slice size and the amount of work available. Accordingly, when the maximum execution slice size is small, and/or when there is a limited amount of work available, jobs may be selected to include a smaller number of date-dependent records. Accordingly, in scenarios in which a limited amount of data is gradually made available (e.g., real-time or near-real-time), jobs may be selected to achieve a small latency for processing such data.

At 320, method 300 includes recognizing a predicted execution slice size for the current job based on a duration defined by the start date and the end date for date-dependent records associated with the current job. The execution slice size may be predicted in any suitable manner. In some examples, the execution slice size may be considered to simply be the duration for the date-dependent records. In some examples, the minimum execution slice size and/or maximum execution slice size are defined as real-world durations comparable to the duration for the date-dependent records. For example, a data source may provide date-dependent records spanning 1 year, and a maximum execution slice size may be 1 month, indicating that a slice of up to 1 month worth of records should be processed at a time.

In other examples, the execution slice size may be predicted in any other suitable manner. For example, the execution slice size for a job may be predicted based on resolution for time-stamps of date-dependent records for the job, overall number of date-dependent records, a predicted execution time for one or more date-dependent records, or any other suitable criteria.

In some examples, the execution slice size may be predicted as a simple linear function of a duration associated with date-dependent records for a job, e.g., by scaling the duration and adding a constant duration offset. In some examples, a scaling factor for the duration may be based on a resolution and/or number of date-dependent records for the job.

At 330, the current job may be either 1) processed, or 2) split into two smaller slices for processing. If the predicted execution slice size for the current job exceeds the maximum execution slice size, and/or the end date for the current job is in the future of the current date, method 300 includes splitting the job into a working slice and a remainder slice and processing the slices separately, at 332 through 338. The current date may be determined in any suitable manner, e.g., using a real-time clock and/or a network clock service.

If dates for a job are in the future of the current date, date-dependent records corresponding to such future dates may not yet be available and/or complete. For example, a job may have an end date days, months, and/or years into the future. Accordingly, date-dependent records for the job may only be gradually available for processing as time passes. By splitting a job with a future end date, the date-dependent records that are already available may be processed immediately, and processing of date-dependent records that are not yet available may be deferred.

If the predicted execution slice for the current job does not exceed the maximum execution slice size, and the end date for the current job is not in the future of the current date, method 300 includes handling the whole job at 352 through 360. After splitting and/or handling the job, a subsequent job may be selected and executed at 370. Accordingly, by splitting and/or handling a job in this fashion, large slices of work may be processed when work is available (up to the maximum execution slice size), and the slices of work may be split to process smaller slices when appropriate (e.g., when work becomes gradually available).

Responsive to one or both of 1) the predicted execution slice size for the current job exceeding the maximum execution slice size, and 2) the end date for the current job being in the future of a current date, method 300 includes splitting the job into a working slice and a remainder slice and handling the slices separately. Optionally, at 332, method 300 includes updating the collection of jobs to indicate that the current job is locked (e.g., to prevent other worker processes from attempting to work on the job while and/or after it is split).

Locking a job while executing the job may prevent conflicts between multiple worker processes trying to handle the same job, and allow the different worker processes to recognize when a job is already being handled, so as to distribute effort across multiple different jobs. In some examples, handling a job includes beginning execution of the job (e.g., according to method 300 as will be described below), and, responsive to determining that the job has been locked by a different worker process, ceasing execution of the job. Accordingly, a worker process may "optimistically" start working on a job even if that job becomes locked before the worker process is able to make progress towards completing the job.

In an example, two worker processes start working on a job at approximately the same time. As such, a first worker process may not initially recognize that the job is locked by a second worker process, and may begin execution of the job. Accordingly, when the first worker process later recognizes that the job is locked (e.g., when the first worker process tries to lock the already-locked job), the first worker process will cease execution of the job. After ceasing execution of the job, the first worker process may select a different job for execution. The optimistic locking strategy may allow worker processes to make quick progress on jobs, while avoiding replication of work and/or conflicts.

At 334, method 300 includes splitting the current job into a working slice and a remainder slice. The size of the slice may be determined in any suitable manner based on the start date, end date, and/or current date. For example, if the current job has an associated predicted execution duration that exceeds the maximum execution slice size, the working slice may include as many date-dependent records as possible given the maximum execution slice size, starting at the start date. Accordingly, the remainder slice may include all remaining records (e.g., spanning until the end date). If the current job has an end date in the future of the start date, the working slice may include as many date-dependent records as possible starting at the start date, and ending at the current date.

At 336, method 300 includes updating the collection of jobs to include the remainder slice. Accordingly, the remainder slice may be selected as a new job. In this manner, the remainder slice is deferred so that the working slice may be immediately processed.

At 338, method 300 includes executing the working slice, e.g., by performing any tasks of the data-processing workflow pertaining to input data in the working slice, so as to produce output data for transmission to an output data sink. At 340, method 300 optionally includes updating the collection of jobs to indicate that the working slice is completed. Alternately or additionally, a job may be preemptively marked as complete (e.g., by locking the job or instead of locking the job) and later marked as incomplete if an error occurs or if a subsequent validation of output data fails, etc.

At 350, method 300 includes recognizing whether the predicted execution slice size exceeds the minimum execution slice size. If not, processing the slice may not be a worthwhile use of resources, e.g., because an overhead for processing a small amount of data would decrease throughput of a concurrent scheduling system. Accordingly, responsive to the predicted execution slice size being less than the minimum execution slice size, method 300 includes selecting and executing a new job at 370.

By deferring small jobs for which not even the minimum execution slice size worth of data is available, method 300 may improve overall throughput of a concurrent scheduling system. In some examples, a minimum slice size may determine an overall latency or periodicity for updates in a data-processing workflow, e.g., if a minimum slice size is set to 1 minute, then even if data is gradually made available (e.g., near-real-time), then jobs will only be processed approximately every 1 minute. In some examples, a minimum execution slice size may be very small (e.g., 0 or 1 date-dependent record), so that very small jobs may be executed immediately rather than deferred. In some examples, responsive to the predicted execution slice size not exceeding the minimum execution slice size, method 300 may include monitoring the collection of jobs in order to select a new job for execution (e.g., so as to eventually select and execute a job at 370, when sufficient work becomes available).

At 352, responsive to the predicted execution slice size for the current job exceeding the minimum execution slice size and not exceeding the maximum execution slice size, method 300 optionally includes updating the collection of jobs to indicate that the current job is locked. At 358, method 300 includes executing the current job. At 360, method 300 optionally includes updating the collection of jobs to indicate that the current job is completed.

At 370, method 300 includes processing further jobs by selecting and executing a new job. In an example, a concurrent scheduling system (e.g., concurrent scheduling system 100 of FIG. 1) includes a plurality of worker processes configured to process jobs according to method 300. Accordingly, after each worker process splits and/or executes a job, the worker may select an additional job for processing. In this manner, the worker processes may concurrently and repeatedly select and complete jobs, thereby completing all of the available jobs in a data-processing workflow.

In some examples, a job may have one or more dependencies on output data from a different job (e.g., intermediate results of processing input data, stored at an output data sink and/or input data source). As such, it may not be possible to process the job until its dependencies have been processed. Method 300 may optionally include recognizing that a portion of the current job depends on completing execution of a prerequisite portion of a prerequisite job of the collection of jobs. Accordingly, method 300 may further include splitting the current job into a satisfiable slice that can be executed irrespective of the prerequisite job, and a dependent slice that depends on the prerequisite portion of the prerequisite job. Accordingly, method 300 may further include adding the dependent slice to the collection of jobs; and executing the satisfiable slice.

In an example, a portion of the current job and a prerequisite portion of the prerequisite job each include an overlapping date range of date-dependent records. For example, the current job may include comparing a datum, for each day of a calendar year, to previously-processed outputs corresponding to the same day, derived from a different input data source. As such, processing a particular date range of the current job may depend on first processing the corresponding date range of the prerequisite job. Accordingly, the satisfiable slice may include all dates for which the data of the prerequisite job have already been processed, and the dependent slice may include dates for which the data of the prerequisite job have not yet been processed.

Optionally, method 300 further includes recognizing an error during execution of a job, and restarting the job at a later time. In some examples, an error may occur due to a temporary insufficiency of resources. Accordingly, method 300 may further include recognizing an insufficiency of resources as the cause of the error, and reducing one or both of the minimum execution slice size and/or the maximum execution slice size, before restarting execution of the job. By reducing the execution slice size(s), when the job is restarted, the overall amount of work to process a slice may be sufficiently small as to mitigate and/or prevent the error.

For example, in a concurrent scheduling system including a plurality of worker processes, each worker process may be configured to recognize errors during execution of a job, and to update the collection of jobs to indicate that the error occurred. Accordingly, the same worker process or a different worker process may later restart execution of the job. For example, a different worker process of the plurality of worker processes may be configured to select, from the collection of jobs, a failed job for which an error occurred. The different worker process may then recognize an insufficiency of resources as a cause of the error. Accordingly, the different worker process may reduce one or both of the minimum execution slice size and/or the maximum execution slice size before restarting execution of the failed job.

Optionally, method 300 further includes assessing a predicted latency for completing execution of a current job based on the duration of date-dependent records for the current job, and observing an actual latency for completing execution of the current job. Responsive to the actual latency substantially exceeding the predicted latency, method 300 may include increasing the minimum slice size for execution of a subsequent job.

For example, if a job is associated with a 1 minute predicted latency based on having 1 minute of date-dependent records for processing, but processing the records actually takes 2 minutes to complete (e.g., due to an overhead incurred in processing a small slice), then the minimum execution slice size may be increased to 2 minutes. Accordingly, if 2 minutes of date-dependent records can then actually be processed within 2 minutes (e.g., because of a relatively smaller overhead for the larger slice), then the throughput for the system may be improved (e.g., because 2 records are processed every 2 minutes, as compared to previous performance of 1 record every 2 minutes). Furthermore, the latency for processing records may be improved, as the system may be able to process incoming records at near-real-time (e.g., instead of falling behind due to overhead from processing small slices).

Although method 300 may include expressly increasing a minimum execution slice size when actual latency exceeds predicted latency as described above, a concurrent scheduling system incorporating method 300 may achieve similar behavior even in absence of such express configuration. In particular, method 300 optionally includes selecting a start date and end date for each job to maximize the duration defined by the start date and end date of the job, e.g., working on the largest possible slice. Accordingly, the concurrent scheduling system may settle into a stable regime in which a duration of records for processing in a slice starts at the minimum slice size and equilibrates to process larger slices based on new data becoming available during processing.

In the above example, if data is gradually available every minute, but processing 1 minute worth of records takes 2 minutes, then after processing a record, there may be 2 minutes of records available the next time a job is selected for execution. As such, the 2 minutes of data may be selected and processed. If processing the 2 minutes of data again takes 2 minutes, there may again be 2 minutes worth of records available for processing. Accordingly, the concurrent scheduling system may adaptively settle into a stable regime of processing 2 minutes of data every 2 minutes, so that data can be processed in near-real-time with near-optimal throughput.

A concurrent scheduling system as described herein may facilitate arbitrary data-processing workflows and/or jobs. In some examples, the data-processing workflow is structured as an extract-transform-load (ETL) workflow. An ETL workflow broadly comprises processing data in 3 phases: 1) extract some or all of the data from one or more input data sources and transmit and/or store the data in a structured form; 2) transform the structured data according to any suitable computational process (e.g., summarizing, analyzing, re-formatting, or otherwise processing the data); and 3) load the data into an eventual storage location, e.g., by transmitting the data to an output data sink configured to store the data.

"Data-processing workflow" may generally refer to any process in which input data are received from one or more input data sources, and processed according to one or more functions to produce output data which are transmitted to one or more output data sinks. Input and data for a data-processing workflow may include any suitable data, annotated to indicate time-stamps for portions of the data (e.g., date-dependent records).

Non-limiting examples of input and/or output data suitable for a data-processing workflow may include any combination of: 1) databases (e.g., rows, columns, queries, and/or tables); 2) unstructured text data and/or structured text data (e.g., JavaScript Object Notation); 3) structured and/or unstructured binary data according to any file format and/or serialization protocol; 4) web pages; 5) emails; 6) documents; 7) printable documents (e.g., Portable Document Format); 8) images of scanned text; 9) photographs; 10) filesystem data; 11) network file protocol data; 12) computer code and/or version control system data; 13) blockchain data; and/or 14) digital and/or analog data from sensors and/or peripherals. Input and/or output data may be stored in a distributed fashion across any combination of computer devices in any suitable fashion, e.g., data warehouse, data mart, cloud service, computer server(s) and/or cluster(s), user devices, enterprise devices, etc.

Input and/or output data may be temporarily and/or permanently stored on computer-readable storage media (e.g., hard disk, SSD, volatile and/or nonvolatile RAM, tape archive, etc.). Specific non-limiting examples of input data include 1) enterprise data (e.g., historical logs, financial data, human resources data); 2) user account/user activity data (e.g., emails, login information); 3) industrial process/logging data; 4) scientific data (e.g., sensor data, simulation data, statistical data); 5) machine learning and/or artificial intelligence data (e.g., input data, training parameters, etc.).

In some embodiments, the methods and processes described herein (e.g., method 200 and/or method 300) may be tied to a computing system of one or more computing devices. In particular, such methods and processes may be implemented as a computer-application program or service, an application-programming interface (API), a library, and/or other computer-program product.

Figure 4:
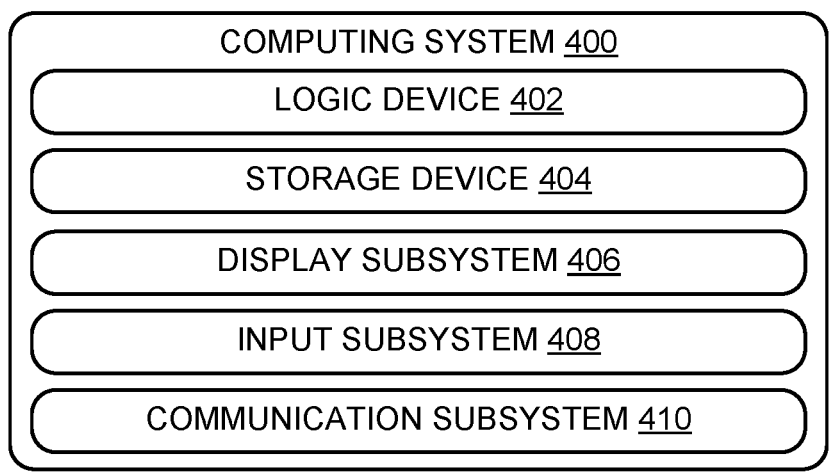
FIG. 4 shows an exemplary computing system.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. For example, computing system 400 may be a concurrent scheduling system 100, a worker system 110, a job collection database 118, and/or a job server system 120. In an example, computing system 400 is a single-core system configured to interleave processing of one or more worker processes. In another example, computing system 400 is a multi-core system configured to concurrently execute a plurality of worker processes.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 304 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

In an example, a method for dynamically scheduling a data-processing workload comprises: recognizing a minimum execution slice size representing a minimum duration of date-dependent records for processing in a job, and a maximum execution slice size representing a maximum duration of date-dependent records for processing in a job; recognizing a predicted execution slice size for a current job from a collection of jobs based on a duration defined by a start date and an end date for date-dependent records associated with the current job; responsive to one or both of 1) the predicted execution slice size for the current job exceeding the maximum execution slice size, and 2) the end date for the current job being in the future of a current date: splitting the current job into a working slice and a remainder slice, adding the remainder slice to the collection of jobs, and executing the working slice; and responsive to the predicted execution slice size for the current job exceeding the minimum execution slice size and not exceeding the maximum execution slice size: executing the current job. In this example or any other example, the data-processing workload is an extract-transform-load process. In this example or any other example, the minimum execution slice size and the maximum execution slice size are selected by an administrator of the data-processing workload. In this example or any other example, the current job is selected based on it being a least-recently-accessed job of the collection of jobs. In this example or any other example, the method further comprises: responsive to recognizing that a portion of the current job depends on completing execution of a prerequisite portion of a prerequisite job of the collection of jobs: splitting the current job into a satisfiable slice that can be executed irrespective of the prerequisite job, and a dependent slice that depends on the prerequisite portion of the prerequisite job; adding the dependent slice to the collection of jobs; and executing the satisfiable slice. In this example or any other example, the portion of the current job and the prerequisite portion of the prerequisite job each include an overlapping date range of date-dependent records. In this example or any other example, the method further comprises: recognizing an error during execution of a job; recognizing an insufficiency of resources as a cause of the error; reducing one or both of the minimum execution slice size and the maximum execution slice size for restarting execution of the job; and restarting execution of the job. In this example or any other example, the method further comprises: assessing a predicted latency for completing execution of the current job based on the duration of date-dependent records for the current job; observing an actual latency for completing execution of the current job; and responsive to the actual latency substantially exceeding the predicted latency, increasing the minimum slice size for execution of a subsequent job. In this example or any other example, the start date and the end date for data associated with the current job are selected to maximize a duration defined by the start date and the end date. In this example or any other example, the method further comprises, responsive to the predicted execution slice size not exceeding the minimum execution slice size, monitoring the collection of jobs in order to select a new job for execution. In this example or any other example, the collection of jobs is a concurrent data structure configured for concurrent reading and writing by a plurality of worker processes; and each worker process is configured, concurrently with the other worker processes, to select and handle a job of the collection of jobs. In this example or any other example, handling a job of the collection of jobs by a worker process includes, responsive to one or both of 1) the predicted execution slice size for that job exceeding the maximum execution slice size, and 2) the end date for that job being in the future of a current date: updating the collection of jobs to indicate that the job is locked; splitting the job into a working slice and a remainder slice; executing the working slice; and updating the collection of jobs to indicate that the working slice is completed. In this example or any other example, handling of a job of the collection of jobs by a worker process includes, responsive to the predicted execution slice size for that job exceeding the minimum execution slice size and not exceeding the maximum execution slice size: updating the collection of jobs to indicate that the job is locked; executing the current job; and updating the collection of jobs to indicate that the job is completed. In this example or any other example, handling of a job of the collection of jobs by a worker process includes: beginning execution of the job; and responsive to determining that the job has been locked by a different worker process, ceasing execution of the job.

In an example, a concurrent scheduling system for dynamically scheduling a data-processing workflow, comprises: a plurality of worker systems, each configured to execute one or more concurrent worker processes, wherein the plurality of worker systems collectively provide a plurality of concurrent worker processes; and a job server system configured to: recognize a minimum execution slice size representing a minimum duration of date-dependent records for processing in a job, and a maximum execution slice size representing a maximum duration of date-dependent records for processing in a job; and maintain a collection of jobs as a concurrent data structure configured for concurrent reading and writing by a plurality of worker processes; wherein each worker process is configured, concurrently with the other worker processes, to: select a current job from the collection of jobs; recognize a predicted execution slice size for the current job based on a duration defined by a start date and an end date for date-dependent records associated with the current job; responsive to one or both of 1) the predicted execution slice size for the current job exceeding the maximum execution slice size, and 2) the end date for the current job being in the future of a current date: update the collection of jobs to indicate that the current job is locked; split the current job into a working slice and a remainder slice; update the collection of jobs to include the remainder slice; execute the working slice; and update the collection of jobs to indicate that the working slice is completed; and responsive to the predicted execution slice size for the current job exceeding the minimum execution slice size and not exceeding the maximum execution slice size: update the collection of jobs to indicate that the current job is locked; execute the current job; and update the collection of jobs to indicate that the current job is completed. In this example or any other example, each worker process is further configured to recognize an error during execution of a job, and update the collection of jobs to indicate that the error occurred; and a different worker process of the plurality of worker processes is configured to: select a failed job for which an error occurred; recognize an insufficiency of resources as a cause of the error; reduce one or both of the minimum execution slice size and the maximum execution slice size for restarting execution of the failed job; and restart execution of the failed job. In this example or any other example, each worker process is further configured, responsive to recognizing that a portion of the current job depends on completing execution of a prerequisite portion of a prerequisite job of the collection of jobs, to: split the current job into a satisfiable slice that can be executed irrespective of the prerequisite job, and a dependent slice that depends on the prerequisite portion of the prerequisite job; add the dependent slice to the collection of jobs; and execute the satisfiable slice.

In an example, a method for dynamically scheduling a data-processing workload comprises: recognizing a minimum execution slice size representing a minimum duration of date-dependent records for processing in a job, and a maximum execution slice size representing a maximum duration of date-dependent records for processing in a job; and maintaining a collection of jobs as a concurrent data structure configured for concurrent reading and writing by a plurality of worker processes; wherein each worker process is configured, concurrently with the other worker processes, to: select a current job from the collection of jobs; recognize a predicted execution slice size for the current job based on a duration defined by a start date and an end date for date-dependent records associated with the current job; responsive to one or both of 1) the predicted execution slice size for the current job exceeding the maximum execution slice size, and 2) the end date for the current job being in the future of a current date: update the collection of jobs to indicate that the current job is locked; split the current job into a working slice and a remainder slice; update the collection of jobs to include the remainder slice; execute the working slice; and update the collection of jobs to indicate that the working slice is completed; and responsive to the predicted execution slice size for the current job exceeding the minimum execution slice size and not exceeding the maximum execution slice size: update the collection of jobs to indicate that the current job is locked; execute the current job; and update the collection of jobs to indicate that the current job is completed. In this example or any other example, each worker process is further configured to recognize an error during execution of a job, and update the collection of jobs to indicate that the error occurred; and a different worker process of the plurality of worker processes is configured to: select a failed job for which an error occurred; recognize an insufficiency of resources as a cause of the error; reduce one or both of the minimum execution slice size and the maximum execution slice size for restarting execution of the failed job; and restart execution of the failed job. In this example or any other example, each worker process is further configured, responsive to recognizing that a portion of the current job depends on completing execution of a prerequisite portion of a prerequisite job of the collection of jobs, to: split the current job into a satisfiable slice that can be executed irrespective of the prerequisite job, and a dependent slice that depends on the prerequisite portion of the prerequisite job; add the dependent slice to the collection of jobs; and execute the satisfiable slice.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for dynamically scheduling a data-processing workload, the method comprising:
   recognizing a minimum execution slice size representing a minimum duration of date-dependent records for processing in a job, and a maximum execution slice size representing a maximum duration of date-dependent records for processing in a job;
   recognizing a predicted execution slice size for a current job from a collection of jobs based on a duration defined by a start date and an end date for date-dependent records associated with the current job;
   responsive to one or both of 1) the predicted execution slice size for the current job exceeding the maximum execution slice size, and 2) the end date for the current job being in the future of a current date:
      splitting the current job into a working slice and a remainder slice,
      adding the remainder slice to the collection of jobs, and executing the working slice; and
   responsive to the predicted execution slice size for the current job exceeding the minimum execution slice size and not exceeding the maximum execution slice size:
      executing the current job.

2. The method of claim 1, wherein the data-processing workload is an extract-transform-load process.

3. The method of claim 1, wherein the minimum execution slice size and the maximum execution slice size are selected by an administrator of the data-processing workload.

4. The method of claim 1, wherein the current job is selected based on it being a least-recently-accessed job of the collection of jobs.

5. The method of claim 1, further comprising:
   responsive to recognizing that a portion of the current job depends on completing execution of a prerequisite portion of a prerequisite job of the collection of jobs:
      splitting the current job into a satisfiable slice that can be executed irrespective of the prerequisite job, and a dependent slice that depends on the prerequisite portion of the prerequisite job;
      adding the dependent slice to the collection of jobs; and
      executing the satisfiable slice.

6. The method of claim 5, wherein the portion of the current job and the prerequisite portion of the prerequisite job each include an overlapping date range of date-dependent records.

7. The method of claim 1, further comprising:
   recognizing an error during execution of a job;
   recognizing an insufficiency of resources as a cause of the error;
   reducing one or both of the minimum execution slice size and the maximum execution slice size for restarting execution of the job; and
   restarting execution of the job.

8. The method of claim 1, further comprising:
   assessing a predicted latency for completing execution of the current job based on the duration of date-dependent records for the current job;
   observing an actual latency for completing execution of the current job; and
   responsive to the actual latency substantially exceeding the predicted latency, increasing the minimum slice size for execution of a subsequent job.

9. The method of claim 1, wherein the start date and the end date for data associated with the current job are selected to maximize a duration defined by the start date and the end date.

10. The method of claim 1, further comprising, responsive to the predicted execution slice size not exceeding the minimum execution slice size, monitoring the collection of jobs in order to select a new job for execution.

11. The method of claim 1, wherein:
   the collection of jobs is a concurrent data structure configured for concurrent reading and writing by a plurality of worker processes; and
   each worker process is configured, concurrently with the other worker processes, to select and handle a job of the collection of jobs.

12. The method of claim 1, wherein handling a job of the collection of jobs by a worker process includes, responsive to one or both of 1) the predicted execution slice size for that job exceeding the maximum execution slice size, and 2) the end date for that job being in the future of a current date:
   updating the collection of jobs to indicate that the job is locked;
   splitting the job into a working slice and a remainder slice;
   executing the working slice; and
   updating the collection of jobs to indicate that the working slice is completed.

13. The method of claim 1, wherein handling of a job of the collection of jobs by a worker process includes, responsive to the predicted execution slice size for that job exceeding the minimum execution slice size and not exceeding the maximum execution slice size:
   updating the collection of jobs to indicate that the job is locked;
   executing the current job; and
   updating the collection of jobs to indicate that the job is completed.

14. The method of claim 1, wherein handling of a job of the collection of jobs by a worker process includes:
  beginning execution of the job; and
  responsive to determining that the job has been locked by a different worker process, ceasing execution of the job.

15. A concurrent scheduling system for dynamically scheduling a data-processing workflow, comprising:
  a plurality of worker computing devices, each worker computing device configured to execute one or more concurrent worker processes, wherein the plurality of worker computing devices collectively execute a plurality of concurrent worker processes; and
  a job server computing device configured to:
    recognize a minimum execution slice size representing a minimum duration of date-dependent records for processing in a job, and a maximum execution slice size representing a maximum duration of date-dependent records for processing in a job; and
    maintain a collection of jobs as a concurrent data structure configured for concurrent reading and writing by a plurality of worker processes;
    wherein each worker process is configured, concurrently with the other worker processes, to:
      select a current job from the collection of jobs;
      recognize a predicted execution slice size for the current job based on a duration defined by a start date and an end date for date-dependent records associated with the current job;
      responsive to one or both of 1) the predicted execution slice size for the current job exceeding the maximum execution slice size, and 2) the end date for the current job being in the future of a current date:
        update the collection of jobs to indicate that the current job is locked;
        split the current job into a working slice and a remainder slice;
        update the collection of jobs to include the remainder slice;
        execute the working slice; and
        update the collection of jobs to indicate that the working slice is completed; and
      responsive to the predicted execution slice size for the current job exceeding the minimum execution slice size and not exceeding the maximum execution slice size:
        update the collection of jobs to indicate that the current job is locked;
        execute the current job; and
        update the collection of jobs to indicate that the current job is completed.

16. The concurrent scheduling system of claim 15, wherein:
  each worker process is further configured to recognize an error during execution of a job, and update the collection of jobs to indicate that the error occurred; and
  a different worker process of the plurality of worker processes is configured to:
    select a failed job for which an error occurred;
    recognize an insufficiency of resources as a cause of the error;
    reduce one or both of the minimum execution slice size and the maximum execution slice size for restarting execution of the failed job; and
    restart execution of the failed job.

17. The concurrent scheduling system of claim 15, wherein each worker process is further configured, responsive to recognizing that a portion of the current job depends on completing execution of a prerequisite portion of a prerequisite job of the collection of jobs, to:
  split the current job into a satisfiable slice that can be executed irrespective of the prerequisite job, and a dependent slice that depends on the prerequisite portion of the prerequisite job;
  add the dependent slice to the collection of jobs; and
  execute the satisfiable slice.

18. A method for dynamically scheduling a data-processing workload, the method comprising:
  recognizing a minimum execution slice size representing a minimum duration of date-dependent records for processing in a job, and a maximum execution slice size representing a maximum duration of date-dependent records for processing in a job; and
  maintaining a collection of jobs as a concurrent data structure configured for concurrent reading and writing by a plurality of worker processes;
  wherein each worker process is configured, concurrently with the other worker processes, to:
    select a current job from the collection of jobs;
    recognize a predicted execution slice size for the current job based on a duration defined by a start date and an end date for date-dependent records associated with the current job;
    responsive to one or both of 1) the predicted execution slice size for the current job exceeding the maximum execution slice size, and 2) the end date for the current job being in the future of a current date:
      update the collection of jobs to indicate that the current job is locked; split the current job into a working slice and a remainder slice;
      update the collection of jobs to include the remainder slice;
      execute the working slice; and
      update the collection of jobs to indicate that the working slice is completed; and
    responsive to the predicted execution slice size for the current job exceeding the minimum execution slice size and not exceeding the maximum execution slice size:
      update the collection of jobs to indicate that the current job is locked; execute the current job; and
      update the collection of jobs to indicate that the current job is completed.

19. The method of claim 18, wherein:
  each worker process is further configured to recognize an error during execution of a job, and update the collection of jobs to indicate that the error occurred; and
  a different worker process of the plurality of worker processes is configured to:
    select a failed job for which an error occurred;
    recognize an insufficiency of resources as a cause of the error;
    reduce one or both of the minimum execution slice size and the maximum execution slice size for restarting execution of the failed job; and
    restart execution of the failed job.

20. The method of claim 18, wherein each worker process is further configured, responsive to recognizing that a portion of the current job depends on completing execution of a prerequisite portion of a prerequisite job of the collection of jobs, to:

split the current job into a satisfiable slice that can be executed irrespective of the prerequisite job, and a dependent slice that depends on the prerequisite portion of the prerequisite job;
add the dependent slice to the collection of jobs; and
execute the satisfiable slice.

\* \* \* \* \*